United States Patent [19]

Fitterer

[11] 4,170,534

[45] Oct. 9, 1979

[54] APPARATUS FOR THE DIRECT CONVERSION OF SOLAR ENERGY INTO ELECTRICITY AND A COMBUSTIBLE GAS BY GALVANIC MEANS

[76] Inventor: George R. Fitterer, 825 12th St., Oakmont, Pa. 15139

[21] Appl. No.: 809,286

[22] Filed: Jun. 23, 1977

[51] Int. Cl.$^2$ .......................... C25B 9/00; H01M 8/12
[52] U.S. Cl. .............................. 204/248; 204/195 S; 204/274; 204/277; 204/278; 429/33
[58] Field of Search ...................... 429/11, 20, 112, 30, 429/31, 33; 204/195 S, 248

[56] References Cited

U.S. PATENT DOCUMENTS

| | | | |
|---|---|---|---|
| 460,122 | 9/1891 | Edison | 429/20 |
| 2,094,102 | 9/1937 | Fitterer | 136/228 |
| 2,570,543 | 10/1951 | Gorin | 429/20 |
| 3,259,523 | 7/1966 | Faris et al. | 429/20 |
| 3,311,506 | 3/1967 | Senderoff | 429/11 |
| 3,413,151 | 11/1968 | Adams et al. | 429/112 |
| 3,421,941 | 1/1969 | Osborne et al. | 429/112 |
| 3,522,097 | 7/1970 | Tedmon et al. | 429/30 |
| 3,578,502 | 5/1971 | Tannenberger et al. | 429/30 |
| 3,598,711 | 8/1971 | Flais | 429/31 |
| 3,619,381 | 11/1971 | Fitterer | 93/58 R |
| 3,752,753 | 8/1973 | Fitterer | 204/195 S |
| 3,773,641 | 11/1973 | Fitterer | 204/195 S |
| 4,043,890 | 8/1977 | Isaacs et al. | 204/195 |

OTHER PUBLICATIONS

Trans, AIME, 105, 290 (1933).
Telkes, J. Applied Physics, 25, 1058 (1954).
Kiukkola and Wagner, J. Electrochemical Soc. 104, 379 (1957).
Direct Energy Conversion Symposium, McGraw-Hill (1966), pp. 42–47.
A Symposium Held by the Gas and Fuel Division of the American Chemical Society at the 136th National Meeting in Atlantic City, Reinhold Pub. Corp. (1964), pp. 1–10, pp. 94–96, pp. 150–152.
Farrington Daniels, Direct Use of the Suns Energy, Ballentine Books 1977, pp. 140–141.

*Primary Examiner*—Donald L. Walton
*Attorney, Agent, or Firm*—Lane, Aitken & Ziems

[57] ABSTRACT

A solid electrolyte galvanic energy conversion cell capable of being heated to at least 2000° C. containing a form of carbon as a fuel internally and being exposed externally to a source of oxygen, such as air, to cause the passage of oxygen ions through the electrolyte thus causing the formation of CO or $CO_2$ as desired. The carbon, for example, a rod, is in electrical contact with a solid electrolyte material having an oxygen ion permeability at a temperature of at least 705° C. In one embodiment, an end of the cell is heated at the focal point of a parabolic solar energy collector and generates electrical energy while expelling CO gas which may later be oxidized to $CO_2$ either by combustion or by means of a secondary galvanic cell to generate additional electrical energy. Since such cells are small, a plurality of cells may be arranged to be heated by a single solar collector with the electrical circuits being arranged in parallel and series configurations to provide the desired power output.

15 Claims, 4 Drawing Figures

APPARATUS FOR THE DIRECT CONVERSION OF SOLAR ENERGY INTO ELECTRICITY AND A COMBUSTIBLE GAS BY GALVANIC MEANS

BACKGROUND OF THE INVENTION

This invention relates to solid electrolyte galvanic energy conversion cells. More particularly, this invention relates to such cells which have a capability of being operated in temperatures on the order of 2000° C. without destructive thermal shock, include carbon within the cell and permit oxygen ions to pass through the electrolyte at temperatures greater than about 705° C. causing formation principally of CO and secondarily of $CO_2$. Still more particularly, this invention relates to such cells in combination with a solar energy collector for generating electricity and CO gas.

Several methods have been suggested for the direct conversion of solar energy into electricity with varying degrees of success. Two of the more efficient methods involve thermopiles and photovoltaic devices.

During the 1950's, many attempts were made to develop generators utilizing parallel and series circuits of thermocouples as thermopiles in which the hot junctions of the thermocouples were exposed to reflected and concentrated solar rays. However, conventional thermocouples provided only slight thermoelectric power. Thus, many investigations were funded to develop new thermocouples having high thermoelectric power. For example, significant monies were expended to investigate the C-SiC thermocouple disclosed in U.S. Pat. No. 2,094,102 and in Trans. AIME, 105, 290 (1933) which had been developed by the inventor of the subject matter of this disclosure. That non-metallic thermocouple exhibits some 300 microvolts per degree centigrade and can be used continuously at 3000° F. Thus, that device has about 30 times the thermoelectric power of that produced by the well known Pt-PtRh couple.

Some of the investigators during this same period determined that thermocouples which exhibited at least 1000 microvolts per degree centigrade would be required if the conversion of solar energy was to become practical by this method. See, for example, M. Telkes, J. Applied Physics, 25, 1058 (1954). To date, however, no such thermocouple has been found.

Thus, attention was directed to other methods of conversion such as photovoltaic devices. Of these, silicon and selenium cells have been the most widely utilized. However, at present, those cells are quite expensive and the power produced per cell is small (i.e., about one watt) at 2 volts per cell. These cells are, of course, tiny and the power output is related to the surface area which is exposed to solar radiation.

Very large solar cell installations are being considered in the event that the prices per cell can be reduced significantly. One projected installation at a future $1/watt cost is being planned for Arizona. This hopefully will develop 14.3 M kilowatts at a total cost of $58 billion. Also, it would require a surface area of 2200 square miles (44×50 miles). Thus, it has been of continuing interest in this art to give consideration to other more compact and less costly methods for directly converting solar energy into electricity.

The method and apparatus of this invention, as described below, constitutes an entirely new approach to the conversion of solar energy to electrical energy compared to those above. The apparatus and method of the invention will not only provide a large amount of electric energy, but will also simultaneously provide considerable quantities of carbon monoxide (CO) gas as a by-product. That gas can be stored and also used later as a fuel. For example, the CO may subsequently be circulated through a lower temperature cell to provide additional electrical energy by converting the CO to $CO_2$.

The chemical reactions which are employed in the cell of the invention preferably generate more molecules of gaseous product than the number of molecules of the gaseous reactant. One such reaction known to the art is the well known "producer-gas reaction" characterized as follows:

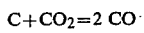
$$C + CO_2 = 2\ CO$$

That reaction was used instead of natural gas for many purposes, including open hearth steel melting furnaces prior to 1930. At present, however, it is seldomly used.

The producer gas reaction is actually a combination of two reactions which are characterized by their standard free energy ($\Delta G^o$) equations, as follows:

$$2C + O_2 = 2\ CO,\ \Delta G_1^o = -53{,}400 - 41.9T$$

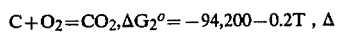
$$C + O_2 = CO_2,\ \Delta G_2^o = -94{,}200 - 0.2T,\ \Delta$$

By subtraction,

$$C + CO_2 = 2CO,\ \Delta G_3^o = 40{,}800 - 41.7T$$

The high entropy term in the free energy equation, $\Delta G_1^o$, is responsible for the essentially exclusive production of CO above about 978° K. or 705° C. (1302° F.) since $40{,}800/41.7 = 978°$ K. Thus, carbon in the presence of one molecule of $O_2$ will produce two molecules of CO above about 705° C.

The relative trends of $\Delta G_1^0$ and $\Delta G_2^0$ in the above equation with temperature may be seen in FIG. 1. Because of the very small entropy term in the $\Delta G_2^o$ equation, the standard free energy for the formation of $CO_2$ is essentially constant over a wide range of temperatures. As shown in FIG. 1, as the temperature rises above 705° C., the formation of CO is very strongly favored.

At 3000° F., or 1920° K., $\Delta G_1^o = -133{,}848$ calories and since $\Delta G_1^0 = -4.575\ T\ \log\ K$, $\log K = 133{,}848/8784 = 15.238$, and $K = 1.72 \times 10^{15} = (pCO)^2/p_{O_2}$. With pure oxygen, $pO_2 = 1$ and with air, $pO_2 = 0.21$. The large negative free energy value and the resultant large equilibrium constant in this example together indicate the strong reaction potential to form CO at high temperatures.

The use of air instead of pure oxygen would only change this equilibrium constant to $3.6 \times 10^{14}$ which is still a very large number showing that the reaction is a very strong one indeed. The fact that the term pCO is squared in the equilibrium constant and that the entropy value for the reaction is large illustrate the promise that this reaction and these observations provide at these high temperatures in connection with the invention.

Viewing the background of the invention from another standpoint, it has also long been the desire of investigators to convert the oxidation reactions of solid carbon, even as coal, directly into electrical energy by electrolytic means, as in a direct fuel cell. A fuel cell is an electrochemical device in which the chemical energy of a fuel is converted directly and usefully into low voltage direct current electrical energy. A simple exemplary prior art fuel cell is known wherein coal is supplied at the anode and air at the cathode. The coal interacts with oxide ions to form $CO_2$ and electricity. See H. A. Liebhofsky and D. L. Douglas, "Fuel Cells" edited by G. J. Young, p. 1 (Reinhold Publishing Corp.), 1964.

However, in such a cell, most attention has been directed toward the reaction:

$$C + O_2 = CO_2$$

which has an essentially constant efficiency of nearly 100% at low temperatures i.e., below 705° C. because of a very small entropy term in the free energy equation at lower temperatures for the reaction, as discussed above. See, W. T. Grubbs and L. W. Niedrach, "Fuel Cells," Direct Energy Conversion, Symposium, McGraw-Hill, 1966, p. 45.

However, it has generally been mistakenly assumed that this advantageous free energy situation will project to 2000° C. Instead, at temperatures above 705° C., the reaction:

$$2C + O_2 = 2CO$$

occurs to produce CO in preference to the formation of $CO_2$, as is illustrated in FIG. 1. Thus, this reaction which predominately produces CO is the one which must principally be considered at temperatures above 705° C.

One so-called Redox fuel cell used CO as a fuel at about 800° C. in which the $CO_2$ which was formed was passed over a hot bed of coal to be converted into CO and passed back through the cell for electrochemical oxidation. See, The Encyclopedia of Electrochemistry, Reinhold Publishing Corp., p. 619, (1964).

In considering the physical implementation of the promise of the foregoing observations, use of solid electrolytes was considered. Starting with the work of Kiukkola and Wagner, J. Electrochemical Soc. 104, 379, (1957), solid electrolytes such as calcia-stabilized zirconia have become widely used for the solution of many different types of problems of commercial interest. See. U.S. Pat. Nos. 3,619,318; 3,752,753; and 3,773,641 to G. R. Fitterer.

This material is available either in the form of a closed-end tube composed completely of the electrolyte or in the form of a disc or a pellet of calcia-stabilized zirconia supported in the end of an insulating refractory tube. It is conceivable that the reaction described herein may be operated with various solid electrolytes providing that they are permeable to oxygen ions at the temperatures of interest. Further, such cells may be miniaturized so that many of such cells may be heated to very high temperatures with the same solar reflector system.

Calcia-stabilized zirconia has the unique property of permitting the passage of only oxygen ions through its walls because of the presence of oxygen vacancies in its atomic structure. Thus, a difference of oxygen pressure on either side of the electrolyte will cause an EMF to be established.

Thus, the prior art efforts suffered from a number of deficiencies which are sought to be overcome by this invention. Accordingly, it is a broad object of this invention to provide a solid electrolyte fuel cell capable of operating at temperature at least as high as 705° C. and as high as 2000° C. to utilize the favorable high temperature reaction of carbon to produce carbon monoxide.

It is a further object of this invention to produce a fuel cell as described above in an embodiment which uses concentrated solar energy as a source of heat to permit the cell to produce CO and electricity.

It is another object of this invention to produce directly a considerable amount of electrical energy and CO gas which may either be burned for additional energy or directed to a second solid electrolyte fuel cell to generate additional electricity and $CO_2$ as an acceptable by-product.

These and other objects of this invention will become apparent from a review of the foregoing background of the invention and the following written description of the invention taken in conjunction with the accompanying drawings.

SUMMARY OF THE INVENTION

In the cell according to the invention, a mass or rod of carbon is continuously pressed against the inside end of a calcia-stabilized zirconia tube with air on the opposite side. As the reaction proceeds, the carbon is consumed and a passage for the nascent CO there produced is provided. Means are provided to continuously maintain contact between the calcia-stabilized zirconia and the carbon which becomes a part of the an electrical circuit. For this purpose, various means may be provided for releasing the CO from the reaction chamber and for its storage for future use as a fuel.

Electrical circuit means, including a conductor or wire connected to the calcia-stabilized zirconia tube, are provided to complete the electrical circuit.

While a rod of carbon is preferably used in the invention, a carbon-containing fuel or carbon in another form may also be used. If coal is used, provisions must be made for the disposition of residue products including ash.

The solid electrolyte is preferably calcia-stabilized zirconia which has a satisfactory oxygen-ion permeability at temperatures at least as high as 705° C. and can withstand temperatures of at least as high as 2000° C. The zirconia is preferably stabilized with CaO in a range of about 5 to about 7.5 percent by weight. The calcia-stabilized zirconia may also include MgO or other oxides such as BeO, in a sufficient quantity to increase the thermal shock resistance of the cell.

A plurality of such cells are used in combination in another embodiment of the invention with a solar collector. The solar collector includes a parabolic mirror for concentrating the rays of the sun at a focal axis of the mirror at which are located the hot junctions of the cells.

DETAILED DESCRIPTION OF THE PREFERRED EMBODIMENTS

Figure 1:
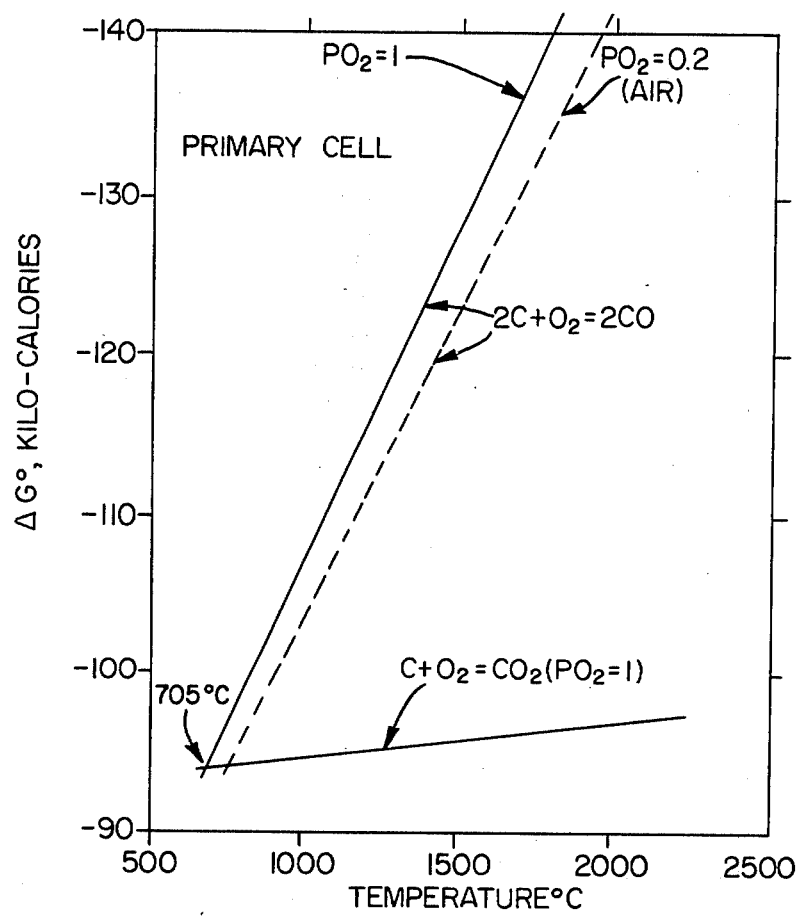
FIG. 1 is a graph comparing the free energies of formation of CO and $CO_2$ as a function of temperature.
Figure 2:
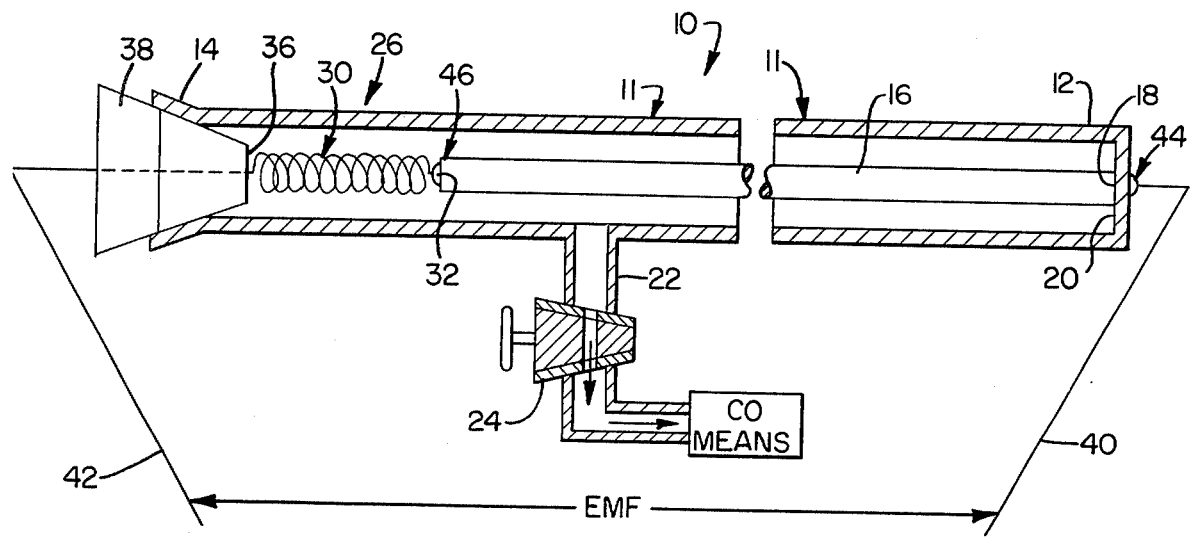
FIG. 2 is a side view, partially in cross section, of a solid electrolyte reaction cell according to the invention.

In FIG. 2, a solid electrolyte reaction cell according to the invention is designated generally by the reference numeral 10. The cell 10 includes an elongated calcia-stabilized zirconia tube 11 having a closed end 12 and an open end 14. A mass or rod 16 of carbon is located within the tube 10 and has an end 18 which is in secure contact with the interior surface 20 of the closed end 12 of the tube 11. Only the portion of the cell in contact with the end 18 of the carbon need be calcia-stabilized zirconia or a suitable equivalent electrolyte material. Thus, the elongated electrolyte tube 16 may comprise an insulating refractory tube, such as quartz or glass, having an open end into which is secured a pellet or disc of electrolyte according to the teachings of the prior Fitterer patents mentioned above.

Air is provided to the outside surface preferably by placement of the closed end 12 of the tube 11 in an ample air environment. However, an external source of pure oxygen or oxygen mixed with a gas inert to the electrolyte may be used.

Figure 4:
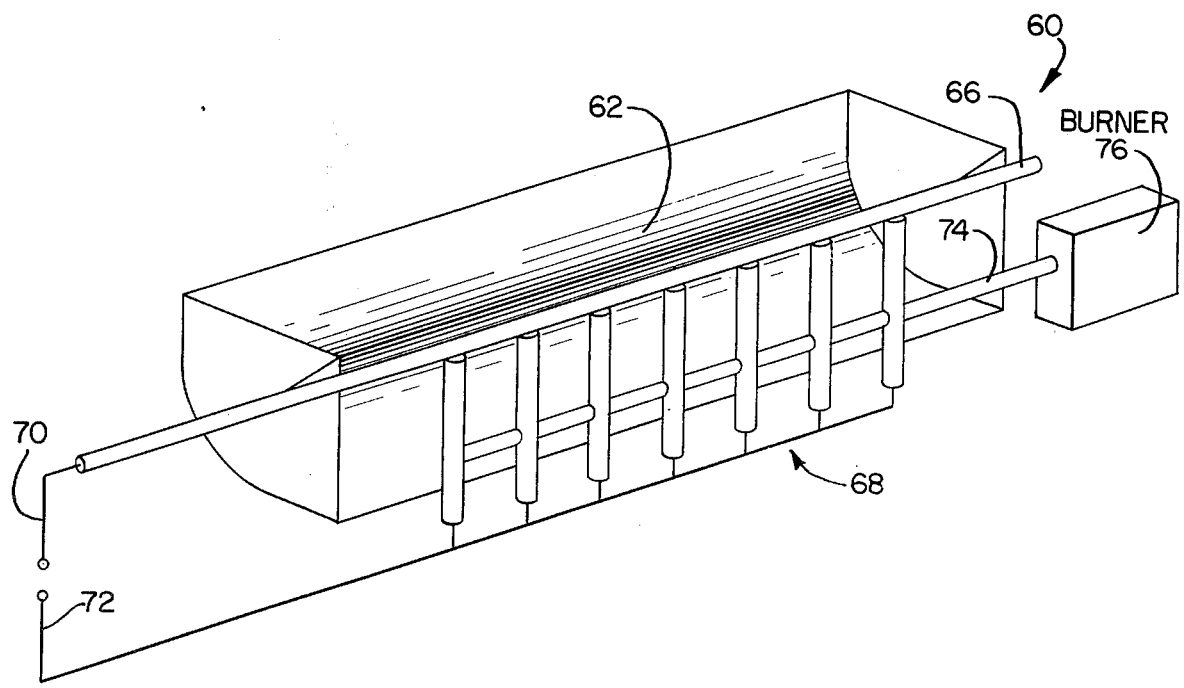
FIG. 4 is a schematic representation, partially in block form, of a plurality of galvanic cells in combination with a solar collector.

Means for maintaining the cell at a temperature in excess of 705° C. are also provided. For example, the cell may be placed in an environment where such heat naturally occurs, or it may be provided from other sources, such as by a solar collector concentrating the energy of the sun by a parabolic reflector, as shown in FIG. 4.

As the above-described reaction proceeds, carbon is consumed and nascent CO produced. A gas discharge tube 22 is in gaseous communication with the interior of the tube 10 to provide a discharge passage for the nascent CO. A flow valve 24 for regulating the flow of gas through the tube 22 is also provided.

Means designated by the reference numeral 26 are provided to continuously maintain contact between the interior surface 20 of the calcia-stabilized zirconia tube 11 and the inner surface 18 of the carbon rod 16. Such contact is necessary to insure a satisfactory electrical contact between the components, particularly in view of the magnitudes of the voltages generated by the cell. The contact-maintaining means 26 comprises a spring 30 suitably secured to the outer end 32 of the carbon rod 16 and to the inner end 36 of a closure member 28. The closure member 38 is snugly fit into the open end 14 of the zirconia tube 11. The closed end 12 is shown flared to receive a similarly configured closure member 38. However, other means for closing the cell may also be used. As the carbon rod 16 is consumed by the reaction in the cell, the spring 30 extends maintaining the desired contact. When consumed, the remaining carbon rod 16 is removed and replaced by a new carbon rod to continue the reaction.

Preferably, the carbon for use in the cell is in the form of a carbon rod. However, other forms of carbon, such as graphite or carbon containing materials such as coal, may also be used and the particular configuration tailored for the particular carbon source. The shape of the carbon rod is not critical so long as a secure electrolyte and electrical contact is maintained between the carbon source and the electrolyte.

Electrical circuit means are provided for the cell. Specifically, the output of the cell is obtained by a pair of electrical leads 40 and 42 in circuit with the cell. The lead 40 is securely electrically connected to an external contact 44 on the exterior surface of the zirconia tube 11. The lead 42 is similarly securely electrically connected to an internal contact 46 on the inner end 32 of the carbon rod 16. Thus, a closed electrical circuit is maintained by the lead 42, the inner contact 46, the carbon rod 16, through the closed end of the zirconia tube 11, the outer contact 44 and the lead 40.

It should be noted that various means 50 may be provided for collecting, storing, or subsequently utilizing the CO gas generated from the cell. For example, the CO gas can be stored for subsequent use as a fuel.

Figure 3:
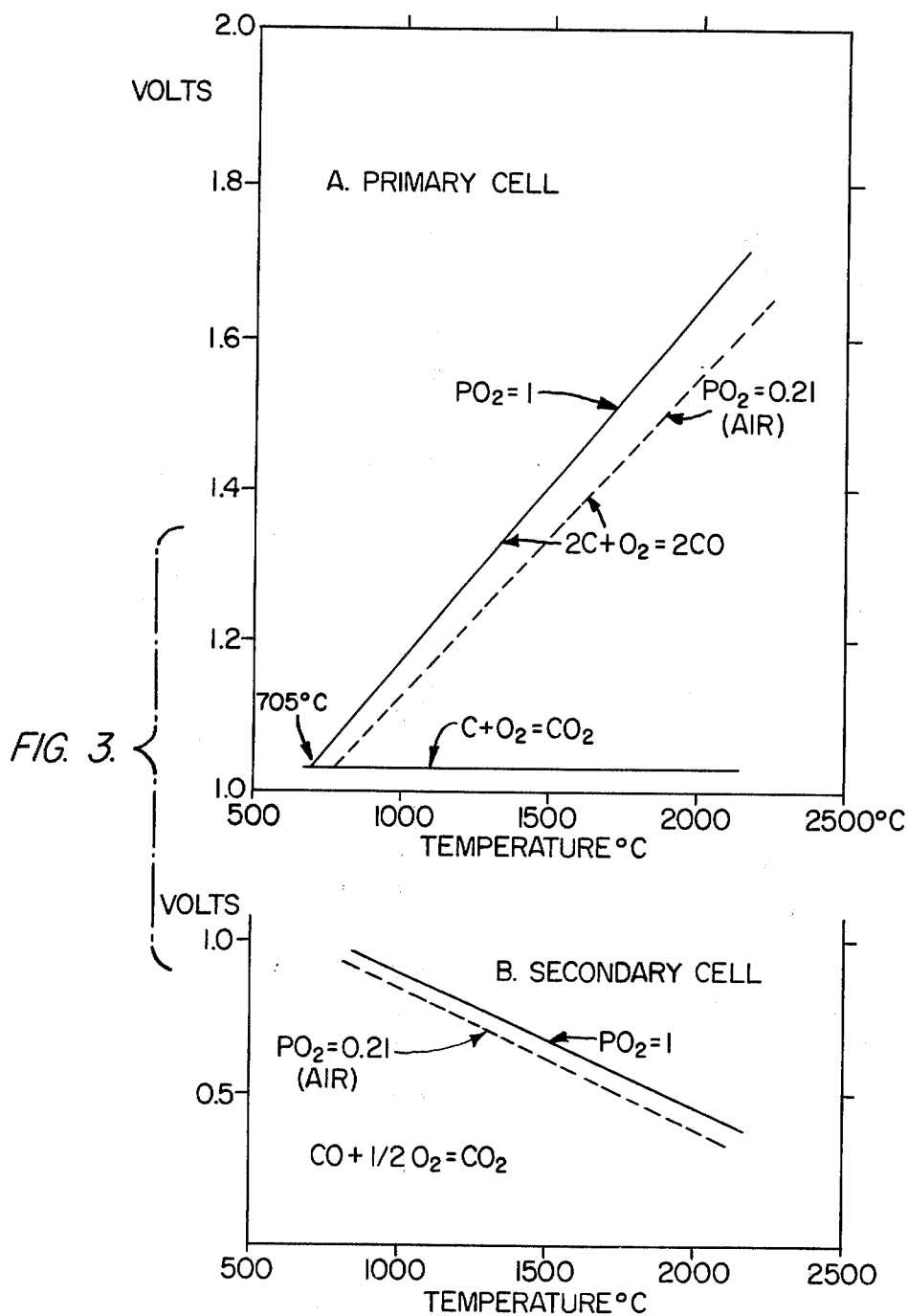
FIG. 3 is a graph showing the generation of electrical energy from both primary and secondary reaction cells.

As stated earlier, both electrical power and a gaseous fuel are the products of this cell 10 as shown in FIG. 3.

The amount of electrical energy which can be developed by the cell 10 described herein is the product of the voltage and the amperage which the cell 10 will develop. The voltage can be appreciable, as illustrated by FIG. 3 where it is shown that at 3000° F. or 1645° C. as much as 1.45 volts or 937 microvolts per degree centigrade can be produced. This is more than three times that of the C-SiC thermocouple mentioned earlier and is of the order of magnitude as a goal which was suggested for thermoelectric devices when used for the conversion of solar energy.

The voltage which will be developed by the cell at various temperatures may be calculated using the Nernst equation and the standard free energy as follows:

$$-nEF = \Delta G_1^\circ - 4{,}575\, T \log P_{O_2} \text{ (Air)}$$

where
n is the ionic transference number (in this case, n=4),
E is the voltage,
F is the Faraday equivalent, or 23066 cal./°K-volt,
$P_{O_2} = 0.21$ for air.

Thus, at 1500° C., or 1773° K., $$E = 122{,}191/92{,}264 = 1.32 \text{ volts}$$

Because of the small atomic weight of carbon, a mere 12 grams of carbon will provide 22.4 liters of CO at ordinary temperature and pressure and nearly six times that amount at 1500° C.

The free energy of combustion of CO may be calculated as follows:

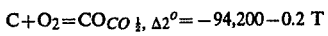

$$C + O_2 = CO_{CO_2},\ \Delta_2^\circ = -94{,}200 - 0.2\, T$$

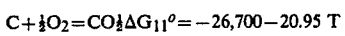

$$C + \tfrac{1}{2}O_2 = CO\ \Delta G_{11}^\circ = -26{,}700 - 20.95\, T$$

Subtracting,

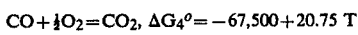

$$CO + \tfrac{1}{2}O_2 = CO_2,\ \Delta G_4^\circ = -67{,}500 + 20.75\, T$$

Thus, in spite of the fact that the entropy factor in the free energy of the combustion reaction is a large positive number, the free energy is −41,085 calories at 1000° C. and −30,710 calories at 1500° C. Thus, the reaction is shown to have a high heating value even at high temperatures.

These are numerous configurations into which a plurality of these fuel cells of FIG. 2 can be combined to accumulate the power in series and/or parallel electrical circuits as needed for a desired application. The gas may also be combined from numerous cells as desired.

The closed end of the cell is placed in a hot zone and the open end in the cold, as in FIG. 2. The heat source may be any available heat, but a principal use of these cells is expected in connection with solar energy.

Various types of solar energy cells can be used since many types of such collectors have been developed. Usually, collectors consist of parabolic mirrors which concentrate the rays on a focal target. Temperatures up to 2000° C. have been measured at these points.

Small units are prepared in which a semispherical parabolic mirror is used and in which the rays are essentially concentrated at a point. As many cells could be placed in contact with the target as desired in a manner so as not to shade the rays from the mirror.

Larger units may also be constructed in which the mirror is a portion of a parabolic shaped cylinder as in FIG. 4. Such a configuration could be made to any length so as to accumulate large amounts of power. The unit could be made to rotate with the sun's movement or be oriented to collect most of the rays during a given season of the year.

FIG. 4 thus shows a schematic representation of a plurality of galvanic fuel cells for generating electricity and CO gas from solar energy. The apparatus of FIG. 4, designated generally by the reference numeral 60, comprises a cylindrical parabolic mirror 62 for focusing the rays of the sun at a focal axis 64 of the mirror. Means, such as a central shaft 66, are provided at about the focal position of the mirror 62 for receiving the hot end (or closed end) of a plurality of solid electrolyte galvanic cells 68, such as those shown and described in connection with FIG. 3. Electrical leads 70 and 72 are respectively provided to the shaft 66 and to a desired electrical combination of leads from each of the individual cells 68. For voltage accumulation, the cells are connected in series while for power increase, the cells are connected in parallel, or in any appropriate combination. Means may be provided for switching the connections of the cells as desired.

The CO gas produced by the plurality of cells 68 may be collected in a manifold 74 to be stored, or combusted for useful heat in a burner, shown diagrammatically as a burner 76.

The invention may be embodied in other specific forms without departing from its spirit or essential characteristics. The present embodiments are, therefore, to be considered in all respects as illustrative and not restrictive, the scope of the invention being indicated by the claims rather than by the foregoing description, and all changes which come within the meaning and range of the equivalents of the claims are therefore intended to be embraced therein.

What is claimed is:

1. A solid electrolyte galvanic cell for continuously generating electricity and producing predominately carbon monoxide from a reaction of oxygen and a carbon fuel, comprising:
   a solid electrolyte having an oxygen ion permeability through the electrolyte in the presence of a source of oxygen at a surface of the electrolyte at electrolyte temperatures in excess of about 705° C.;
   a carbon-containing fuel in electrical contact with an opposed surface of the solid electrolyte to form a galvanic cell which includes said electrolyte and said fuel;
   means for heating said cell in the presence of said source of oxygen for the electrolyte to a temperature sufficient to form predominately carbon monoxide from the reaction of carbon in the carbon-containing fuel and oxygen passing through the solid electrolyte whereby electricity is simultaneously and continuously generated by the transfer of oxygen ions through the solid electrolyte at said temperatures; and
   electrical circuit means forming an electrical circuit with said electrolyte and said carbon-containing fuel to receive continuously said electricity from said cell.

2. The cell as set forth in claim 1 wherein said temperature is at least 705° C.

3. The cell as set forth in claim 1 wherein said temperature is as high as about 2000° C.

4. The fuel cell of claim 1 wherein the heating means comprises means for obtaining heat from the rays of the sun to produce said temperatures.

5. The fuel cell of claim 1 wherein said cell includes means for receiving said carbon monoxide gas from said cell for storage or subsequent combustion.

6. The fuel cell of claim 1 wherein said electrical circuit means includes electrical leads in electrical circuit with the carbon-containing fuel and the solid electrolyte.

7. The cell as set forth in claim 1 wherein the solid electrolyte is calcia-stabilized zirconia.

8. The fuel cell of claim 7 wherein said calcia-stabilized zirconia contains CaO in a range from about 5 to about 7.5%.

9. The fuel cell of claim 7 wherein said calcia-stabilized zirconia includes MgO or other oxides such as BeO in a sufficient quantity to increase the thermal shock resistance of said cell.

10. The fuel cell of claim 1 wherein said electrolyte is a closed-end tube, said carbon containing fuel is a carbon rod having an end in electrical contact with a surface of said electrolyte to form said cell, and wherein the electrical circuit means forms an electrical circuit with the opposed surface of said electrolyte and with the carbon rod.

11. The fuel cell of claim 10 further including means for continuously maintaining contact between the carbon rod and the electrolyte while the carbon is consumed in said cell.

12. The fuel cell of claim 10 further including means for continuously maintaining contact between the carbon rod and the electrolyte while the carbon is consumed in said cell.

13. An apparatus for producing electricity and generating CO gas comprising:
   a plurality of fuel cells which include a solid electrolyte having a permeability to oxygen ions at temperatures in excess of 705° C. in electrical contact with a carbon-containing fuel in the presence of a source of oxygen for said electrolyte to produce predominately carbon monoxide and simultaneously to generate electricity by the transfer of oxygen ions through the electrolyte at said temperatures;
   means for electrically connecting said plurality of fuel cells to receive said electricity;
   means for collecting said carbon monoxide from said fuel cells; and
   solar energy means for focusing solar energy on said cell to reach said temperatures.

14. The apparatus as set forth in claim 13 wherein said solar energy means includes solar reflecting means for focusing solar energy at about an axis at which are located the plurality of fuel cells.

15. The apparatus as set forth in claim 13 wherein said collecting means further includes at least one cell of the type described for receiving said carbon monoxide as a source of oxygen ions therefor to produce additional electricity and carbon dioxide as the reaction products thereof.

* * * * *

UNITED STATES PATENT AND TRADEMARK OFFICE
CERTIFICATE OF CORRECTION

PATENT NO. : 4,170,534
DATED : October 9, 1979
INVENTOR(S) : George R. Fitterer

Page 1 of 2

It is certified that error appears in the above-identified patent and that said Letters Patent are hereby corrected as shown below:

Column 2, line 24, the equation should read:
-- $2C + O_2 = 2\ CO,\ \Delta G_1^O = -53,400 - 41.9T$ --.

Column 2, line 26, the equation should read:
-- $C + O_2 = CO_2,\ \Delta G_2^O = -94,200 - o.2T$ --.

Column 2, line 30, the equation should read:
-- $C + CO_2 = 2\ CO,\ \Delta G_3^O = 40,800 - 41.7T$ --.

Column 2, line 33, "$\Delta G_1^O$" should read -- $\Delta G_1^O$ --.

Column 2, line 38, "$\Delta G_1^O$" and "$\Delta G_2^O$" should read -- $\Delta G_1^O$ -- and -- $\Delta G_2^O$ --.

Column 2, line 40, "$\Delta G_2^O$" should read -- $\Delta G_2^O$ --.

Column 2, line 46, "$\Delta G_1^O$" should read -- $\Delta G_1^O$ --.

Column 2, line 47, "$\Delta G_1^O$" should read -- $\Delta G_1^O$ --.

Column 2, line 49, the equation should read:
-- $K = 1.72 \times 10^{15} = (pCO)^2 / p_{O_2}$ --.

Column 5, line 46, numeral "28" should read -- 38 --.

Column 6, line 29, the equation should read:
-- $-nEF = \Delta G_1^O - 4,575\ T \log P_{O_2}\ (Air)$ --.

UNITED STATES PATENT AND TRADEMARK OFFICE
CERTIFICATE OF CORRECTION

PATENT NO. : 4,170,534
DATED : October 9, 1979
INVENTOR(S) : George R. Fitterer

It is certified that error appears in the above-identified patent and that said Letters Patent are hereby corrected as shown below:

Column 6, line 48, the equation should read:
-- $C + O_2 = CO_2$, $\Delta G_2^o = -94,200 - 0.2\ T$ --.

Column 6, line 50, the equation should read:
-- $C + 1/2\ O_2 = CO\ \ 1/2 \Delta G_1^o = -26,700 - 20.95\ T$ --.

Column 6, line 54, the equation should read:
-- $CO + 1/2\ O_2 = CO_2$, $\Delta G_4^o = -67,500 + 20.75\ T$ --.

Signed and Sealed this

Fifth Day of February 1980

[SEAL]

Attest:

SIDNEY A. DIAMOND

Attesting Officer

Commissioner of Patents and Trademarks